(12) United States Patent
Schnittger et al.

(10) Patent No.: US 8,297,297 B2
(45) Date of Patent: Oct. 30, 2012

(54) COMPRESSED AIR SUPPLY SYSTEM FOR A COMMERCIAL VEHICLE AND METHOD FOR OPERATING A COMPRESSED AIR SUPPLY SYSTEM

(75) Inventors: Karsten Schnittger, Munich (DE); Oliver Kaupert, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 445 days.

(21) Appl. No.: 12/562,810

(22) Filed: Sep. 18, 2009

(65) Prior Publication Data

US 2010/0065129 A1   Mar. 18, 2010

Related U.S. Application Data

(63) Continuation of application No. PCT/EP2008/002130, filed on Mar. 18, 2008.

(30) Foreign Application Priority Data

Mar. 19, 2007   (DE) .......................... 10 2007 013 672

(51) Int. Cl.
*F16K 11/22* (2006.01)
*F16K 11/24* (2006.01)
*B60T 17/04* (2006.01)
*B60T 13/68* (2006.01)
*B60T 13/70* (2006.01)

(52) U.S. Cl. ......... 137/115.04; 137/115.07; 137/115.25; 137/883; 303/16; 251/30.01

(58) Field of Classification Search ............. 137/115.25, 137/597, 544, 883, 115.04, 115.07; 303/13, 303/15, 16; 251/30.01
See application file for complete search history.

(56) References Cited

U.S. PATENT DOCUMENTS

| 6,089,831 A |   | 7/2000 | Bruehmann et al. |
|---|---|---|---|
| 6,098,967 A | * | 8/2000 | Folchert ...................... 267/64.16 |
| 7,431,406 B2 | * | 10/2008 | Aumuller et al. ............... 303/15 |

(Continued)

FOREIGN PATENT DOCUMENTS

DE   103 23 037 A1   12/2004

(Continued)

OTHER PUBLICATIONS

German Search Report dated Oct. 23, 2008 including English translation (Six (6) pages).

(Continued)

*Primary Examiner* — Craig Schneider
*Assistant Examiner* — Atif Chaudry
(74) *Attorney, Agent, or Firm* — Crowell & Moring LLP

(57) ABSTRACT

A compressed air supply system and method of operating same for a commercial vehicle includes a compressed air inlet that can be coupled to a compressor, a filter unit that can be coupled to the compressed air inlet via a supply line, a discharge valve element that is coupled to a discharge outlet and the supply line, a first valve element and a second valve element. A control inlet of the discharge valve element is controllable by the first valve element and the second valve element is arranged in a regeneration air path for regenerating the filter unit. At least one pneumatically lockable overflow valve via which a consumer circuit coupled to the compressed air supply system is supplied with compressed air. The at least one pneumatically lockable overflow valve can be controlled by the second valve element.

15 Claims, 2 Drawing Sheets

U.S. PATENT DOCUMENTS

2005/0017474 A1* 1/2005 Heer ................... 280/124.16
2005/0173881 A1* 8/2005 Harrison et al. ......... 280/124.16

FOREIGN PATENT DOCUMENTS

| DE | 10 2005 057 004 B3 | 4/2007 |
|---|---|---|
| EP | 1 318 936 B1 | 6/2003 |
| EP | 1 479 584 B1 | 11/2004 |
| WO | WO 96/34785 A1 | 11/1996 |

OTHER PUBLICATIONS

International Search Report dated Aug. 5, 2008 including English translation (Four (4) pages).

* cited by examiner

COMPRESSED AIR SUPPLY SYSTEM FOR A COMMERCIAL VEHICLE AND METHOD FOR OPERATING A COMPRESSED AIR SUPPLY SYSTEM

CROSS REFERENCE TO RELATED APPLICATIONS

This application is a continuation of PCT International Application No. PCT/EP2008/002130, filed Mar. 18, 2008, which claims priority under 35 U.S.C. §119 to German Patent Application No. 10 2007 013 672.4, filed Mar. 19, 2007, the entire disclosures of which are herein expressly incorporated by reference.

This application contains subject matter related to U.S. application Ser. No. 12/562,851, entitled "Compressed Air Supply System for a Commercial Vehicle and Method for Operating Said Compressed Air Supply System," and U.S. application Ser. No. 12/562,547, entitled "Compressed Air Supply System for a Commercial. Vehicle, and Method for Operating a Compressed Air Supply System," both filed on even date herewith.

BACKGROUND AND SUMMARY OF THE INVENTION

The invention relates to a compressed air supply system for a commercial vehicle having a compressed air inlet that can be coupled to a compressor, a filter module coupled to the compressed air inlet via a delivery line, a discharge valve unit coupled to a discharge outlet and the delivery line, and a first valve unit and a second valve unit. The first valve unit serves to control a control inlet of the discharge valve unit and the second valve unit is arranged in a regeneration air path for the regeneration of the filter module. At least one pneumatically closable overflow valve serves to supply a consumer circuit coupled to the compressed air supply unit with compressed air.

The invention further relates to a method for operating a compressed air supply system having a compressed air inlet that can be coupled to a compressor, a filter module coupled to the compressed air inlet via a delivery line, a discharge valve unit coupled to a discharge outlet and the delivery line, and a first valve unit and a second valve unit. The second valve unit is arranged in a regeneration air path for the regeneration of the filter module. In the method, at least one pneumatically closable overflow valve serves to supply a consumer circuit coupled to the compressed air supply unit with compressed air and the first valve unit serves to control a control inlet of the discharge valve unit.

Such compressed air supply systems fulfill numerous functions in commercial vehicles. These include, in particular, the supply of dry, purified compressed air to the braking system and other compressed air consumers, the exercise of a multi-circuit safety valve function to reciprocally safeguard various consumer circuits and to ensure a specific filling order, and the provision of a pressure regulator function. The compressed air used by the compressed air consumers is provided primarily by a compressor, which is generally driven by the internal combustion engine of the commercial vehicle. In many systems, the compressor can be brought into an energy-saving state, either by separating a clutch, which serves to couple the compressor to the internal combustion engine, or by pneumatic actuation of a compressor control inlet, in order to bring the compressor into an idling state.

Besides the delivery operating state of the compressed air supply system, an important further operating state to achieve is the regeneration operating state for the filter unit. For this purpose dry, compressed air is fed from the compressed air reservoirs connected to the compressed air supply systems through the filter module in a direction opposed to the delivery direction. The air flowing through the filter module at least partially absorbs the moisture in the filter module before flowing out into the open via the discharge valve of the compressed air supply system.

WO 96/34785 A1 discloses a compressed air supply system, the consumer circuits of which are supplied by pneumatically closable overflow valves. In this way it is possible, irrespective of the closing or opening pressure of the overflow valves, purposely to intervene in the supply or safeguarding of the consumer circuits and the regeneration process by purposely closing one or more overflow valves.

According to WO 96/34785 A1, the regeneration of the compressed air supply unit is accomplished by the opening of a discharge valve and the selective extraction of compressed air from one or more of the consumer circuits. In order to allow this selective extraction, it is necessary to assign to each of the overflow valves a solenoid valve, which is specifically intended for the purpose of closing the overflow valve as required, resulting in a comparatively high overall equipment cost.

The object of the invention is to provide a compressed air supply unit and a method of operation, which will allow influencing of the filling order at the lowest possible equipment cost.

This object is achieved by a compressed air supply system for a commercial vehicle having a compressed air inlet that can be coupled to a compressor, a filter module coupled to the compressed air inlet via a deliver line, a discharge valve unit coupled to a discharge outlet and the deliver line, a first valve unit and a second valve unit, the first valve unit serving to control a control unit of the discharge valve unit and the second valve unit being arranged in a regeneration air path for the regeneration of the filter module, and at least one pneumatically closable overflow valve, which serves to supply a consumer circuit coupled to the compressed air supply unit with compressed air, wherein the at least one pneumatically closable overflow valve is capable of actuation by the compressed air supply system.

Advantageous embodiments of the invention are described herein.

According to an aspect of the invention, at least one pneumatically closable overflow valve is capable of actuation by the second valve unit. The second valve unit therefore has a dual function. On the one hand, it serves to close or open the regeneration air path, the second valve unit itself being an integral part of the regeneration air path. On the other hand, the second valve unit serves for the selective closing of overflow valves, so that a plurality of largely independent functions are advantageously integrated into one component of the compressed air supply unit.

At least one pneumatically closable overflow valve is here usefully assigned to a consumer circuit, which failing pneumatic closure of the overflow valve can be filled with a higher priority than at least one further parallel consumer circuit, so that on closing of the overflow valve at least one further consumer circuit can be filled before the consumer circuit coupled to at least one pneumatically closable overflow valve. Closing of the overflow valves therefore serves to temporarily defer the filling of specific consumer circuits of intrinsically high filling priority, such as the service brake circuits, for example, and instead to fill a circuit of normally low filling priority.

In this context, the further consumer circuit is usefully assigned to the pneumatic suspension of the commercial vehicle.

The provision of an electronic control module is furthermore particularly advantageous. This may, in particular, be integrated into the compressed air supply system. It is further advantageous if the valve units are solenoid valves.

It is furthermore preferable to assign a pressure sensor, which is integrated into the compressed air supply system and is connected to the electronic control module, to the further consumer circuit. It is also feasible, however, for the electronic control module to have an interface, via which signals characteristic of the pressure in the further consumer circuit can be transmitted.

With respect to the method of the invention, at least one pneumatically closable overflow valve is actuated by the second valve unit. In this way, the advantages and particular features of the inventive compressed air supply system are also embodied as a method. This also applies to the especially preferred embodiments of the method specified below.

In a useful development of the method, at least one pneumatically closable overflow valve is assigned to a consumer circuit, which failing pneumatic closure of the overflow valve can be filled with a higher priority than at least one further parallel consumer circuit, so that on closing of the overflow valve at least one further consumer circuit can be filled before the consumer circuit coupled to at least one pneumatically closable overflow valve. The further consumer circuit is furthermore assigned to the pneumatic suspension of the commercial vehicle.

The method is furthermore advantageous in that it is controlled by an electronic control module. The pressure in the further consumer circuit is furthermore usefully determined within the compressed air supply system and in the form of a corresponding signal is transmitted directly to the electronic control module.

Alternatively or in addition, the pressure in the further consumer circuit is determined and in the form of a corresponding signal is relayed to the electronic control module via an interface coupled to a data bus.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
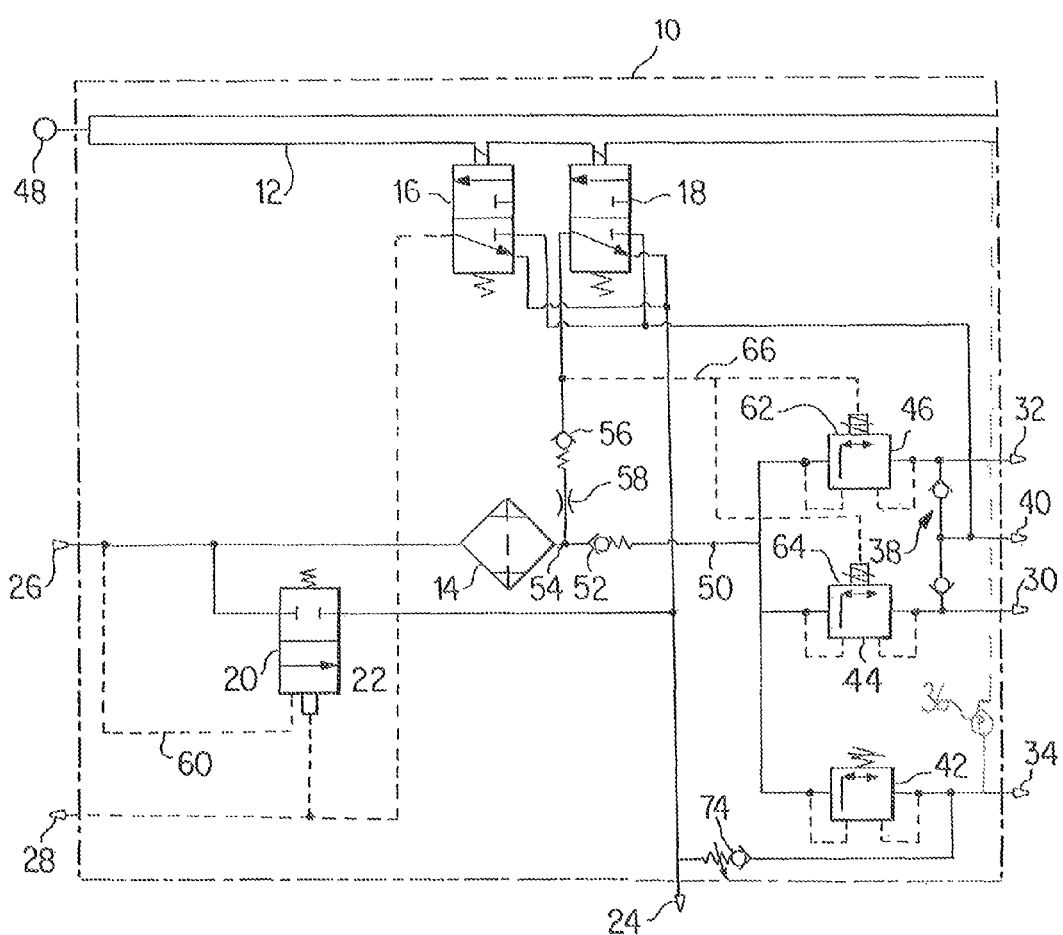
FIG. 1 is a schematic, partial representation of a first embodiment of a compressed air supply system according to the invention.

The compressed air supply system 10 includes an electronic control module 12. The control module 12 is equipped with an electrical interface 48 for the purpose of energy supply and signal exchange with other vehicle components. Two 3/2-way solenoid valves 16, 18 are capable of actuation by the electronic control module 12. Other components, such as a heating system, a plurality of pressure sensors and further solenoid valves, for example, which may be provided in connection with the electronic control module 12, are not represented.

The compressed air supply system 10 has a compressed air inlet 26, which can be coupled to a compressor, and a discharge outlet 24. A discharge valve 20 is arranged between the compressed air inlet 26 and the discharge outlet 24. Also connected to the compressed air inlet 26 is a filter module 14. The compressed air delivered to the compressed air inlet 26 is fed to the consumer circuits via this filter module 14, a non-return valve 52, which prevents compressed air flowing back from the consumer circuits, also being provided on this path.

The consumer circuits are generally supplied from the supply line 50, coupled to the non-return valve 52, via a multi-circuit safety valve unit, here exemplified by three overflow valves 42, 44, 46, incorporated into the compressed air supply system. The overflow valves 44, 46, for example, directly supply the service brake circuits 30, 32 of the commercial vehicle. The overflow valve 42, for example, supplies the pneumatic suspension circuit 34 of the commercial vehicle.

The pressure in the pneumatic suspension circuit 34 is registered by a pressure sensor 36, which is electrically connected to the electronic control module 12. The pressures of the other consumer circuits may also be monitored by pressure sensors, the latter not being shown here.

The service brake circuits 30, 32 are connected to one another via a shuttle valve 38. Attached to this shuttle valve 38 is a supply line 40, which serves, in particular, to supply further consumer circuits, the supply line 40 being connected to overflow valves, which are assigned to these consumer circuits. The subordinate consumer circuits are therefore supplied in series via the supply line 40, whilst the pneumatic suspension circuit 34 is supplied with compressed air in parallel with the service brake circuits 30, 32. It is also possible, instead of supplying the consumer circuits in series via the supply line 40, to supply the remaining consumer circuits in parallel, that is to say directly from the supply line 50 without passing through the overflow valves 44, 46.

The overflow valves 44, 46 each have a control inlet 62, 64, the pressurization of which acts in the same direction as the closing force of the overflow valves 44, 46. A control line 66, which actuates these control inlets 62, 64, is connected to a solenoid valve 18. This solenoid valve 18 is embodied as a 3/2-way valve, the remaining connections of the solenoid valve 18 being connected to the supply line 40 and the discharge outlet 24 of the compressed air supply system 10, respectively. The connection of the solenoid valve 18 connected to the control line 66 is further connected by way of a non-return valve 56 and a restrictor 58 to a line section 54 between the filter module 14 and the non-return valve 52. In this respect, the solenoid valve 18 is an integral part of a regeneration air path, which connects the supply line 40 to the discharge outlet 24 via the solenoid valve 18, the non-return valve 56, the restrictor 58, the filter module 14 and the discharge valve 20.

A further solenoid valve 16 is likewise connected to the supply line 40 and the discharge outlet 24. The remaining connection of the 3/2-way solenoid valve 16 serves for actuation of a control inlet 22 of the discharge valve 20 and an energy-saving control outlet 28, which serves for the connection of a control inlet of a compressor. Ventilation of the energy-saving control outlet 28 brings the compressor into an energy-saving state, that is to say a so-called idling state. It is also feasible, via the energy-saving control outlet 28, to activate a controllable clutch, which depending on the control state of the clutch serves to couple the compressor to the internal combustion engine of the commercial vehicle or to separate it therefrom. It is also possible to dispense entirely with the energy-saving control outlet 28 and to use an electrical control signal for energy management of the compressor. A further control line 60 is provided, so that the discharge valve 20 can also function as a pressure-relief valve. It is likewise feasible to provide a separate pressure-relief valve for this purpose.

With regard to the regeneration of the filter module 14, the compressed air supply system 10 functions as follows. In a first operating state, both solenoid valves 16, 18 are unenergized. Consequently the regeneration air path is closed, and the energy-saving control outlet 28 is evacuated, so that the compressor connected thereto delivers and the discharge valve 20 is closed due to the evacuated control inlet 22. If both solenoid valves 16, 18 are energized, the regeneration air path is open, and the energy-saving control outlet 28 is ventilated, so that the compressor idles and the discharge valve 20 is opened.

The solenoid valve 18 fulfills a further function with regard to the filling of the consumer circuits 30, 32, 34 and the ventilation of the supply line 40. If the valve 18 is unenergized, filling is performed in the conventional filling order, which is defined by the opening pressures of the overflow valves 42, 44, 46. Normally therefore, the service brakes circuits 30, 32 have filling priority. If the solenoid valve 18 is energized, however, and the control inlets 62, 64 of the overflow valves 44, 46 are thereby ventilated, this closes the overflow valves 44, 46. Consequently, the pneumatic suspension circuit 34 is first filled via the overflow valve 42 connected in parallel. The pressure sensor 36 here ensures pressure control of the compressed air supply system 10. If no pressure sensor is incorporated into the compressed air supply system 10 for this purpose, the pressure of the pneumatic suspension circuit can also be determined elsewhere, and a corresponding signal transmitted to the electronic control module 12 of the compressed air supply system, in particular via the electrical interface 48. Instead of the pressure sensor 36 or in addition to the pressure sensor 36, a pressure relief valve may also be provided (see also FIG. 2).

Figure 2:
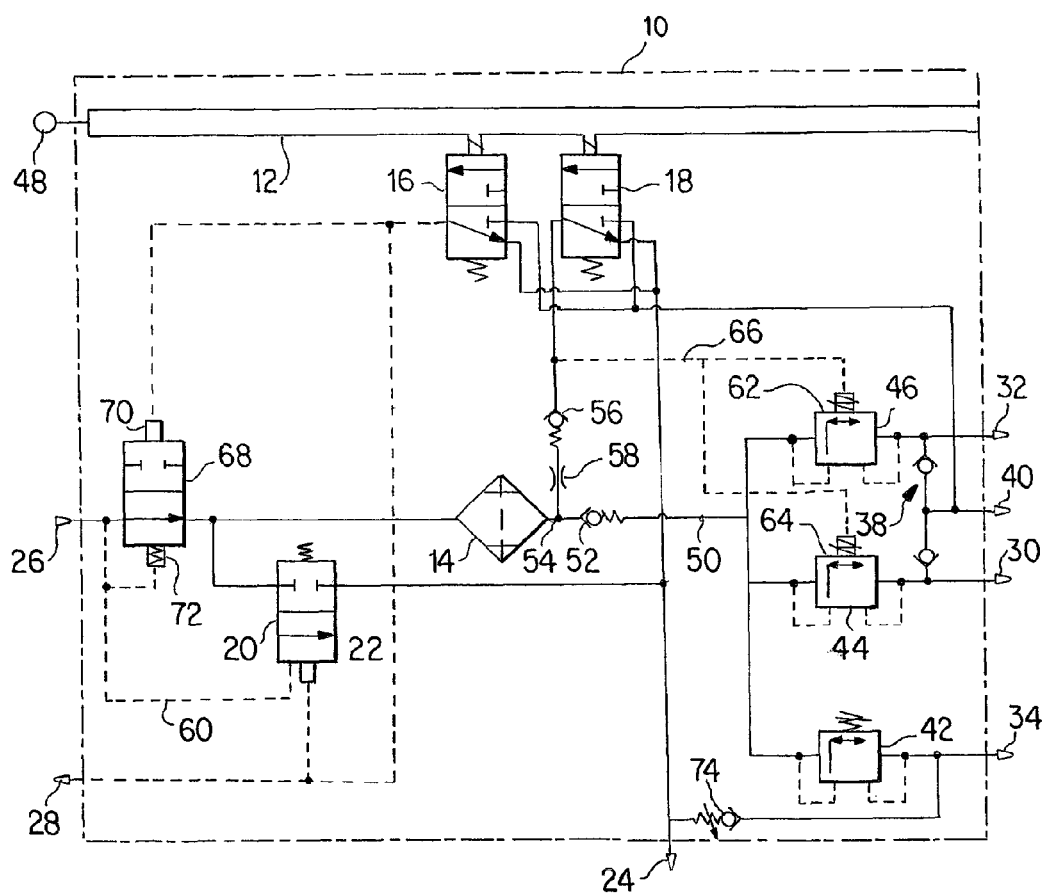
FIG. 2 is a schematic, partial representation of a second embodiment of a compressed air supply system according to the invention.

FIG. 2 shows a schematic, partial representation of a second embodiment of a compressed air supply system according to the invention. As has already been mentioned in connection with FIG. 1, a pressure relief valve 74, as shown here, may be connected to the pneumatic suspension circuit 34. On the other hand, the embodiment according to FIG. 2 may also be equipped with a pressure sensor in the pneumatic suspension circuit 34. Otherwise the embodiment in FIG. 2 largely corresponds to that of FIG. 1, a delivery line shut-off valve 68 being additionally provided here, however. This valve 68 has a first control inlet 70, which is coupled to the solenoid valve 16. A second control inlet 72 is connected directly to the compressed air inlet 26. If the regeneration of the filter module 14 is therefore initiated by switching of the two solenoid valves 16, 18, the delivery line shut-off valve 68 can thereby be brought into its closed state due to the ventilation of the first control inlet 70. Consequently, the volume of compressed air between the compressor and the delivery line shut-off valve 68 is not lost during the regeneration. If operation of the compressor is resumed, the evacuation of the control inlet 70 and the ventilation of the control inlet 72 ensures switching of the delivery line shut-off valve 68.

It has been described in connection with FIGS. 1 and 2 that the solenoid valves 16, 18 are supplied with a compressed air supply from a point downstream of the overflow valves 44, 46. It is also possible, however, to supply the compressed air from the supply line 50, that is to say from a point downstream of the non-return valve 52, but upstream of the multi-circuit safety valve unit.

The present invention is furthermore not limited to the circuit connections described for the solenoid valves 16, 18. The control functions of the compressed air supply system can also be divided in some other way between these solenoid valves 16, 18 or even exercised by other control elements

TABLE OF REFERENCE SYMBOLS

10 compressed air supply system
12 electronic control module
14 filter module
16 valve unit
18 valve unit
20 discharge valve
22 control inlet
24 discharge outlet
26 compressed air inlet
28 energy-saving control outlet
30 service brake circuit
32 service brake circuit
34 pneumatic suspension circuit
36 pressure sensor
38 shuttle valve
40 supply line
42 overflow valve
44 overflow valve
46 overflow valve
48 interface
50 supply line
52 non-return valve
54 line section
56 non-return valve
58 restrictor
60 control line
62 control input
64 control input
66 control line
68 delivery line shut-off valve
70 control input
72 control input
74 pressure-relief valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed air supply system for a commercial vehicle, comprising:
a compressed air inlet coupleable to a compressor;
a filter module coupled to the compressed air inlet via a delivery line;
a discharge valve unit coupled to a discharge outlet and the delivery line;
first and second valve units, the first valve unit being operatively configured to control a control inlet of the discharge valve unit and the second valve unit being operatively arranged in a regeneration air path for regenerating the filter module; and
at least one pneumatically closable overflow valve, operatively configured to supply a consumer circuit coupleable to the compressed air supply unit with compressed air, wherein said at least one pneumatically closable overflow valve is actuatable by the compressed air supply system;

wherein said one pneumatically closable overflow valve is assigned to a particular consumer circuit which, in an event of a failure of the overflow valve, is fillable with a higher priority than at least one additional parallel consumer circuit; and wherein upon closing of said overflow valve, at least one further consumer circuit is fillable before the consumer circuit coupleable to said at least one pneumatically closable overflow valve.

2. The compressed air supply system according to claim 1, wherein the further consumer circuit is assigned to a pneumatic suspension of the commercial vehicle.

3. The compressed air supply system according to claim 1, further comprising an electronic control module operatively arranged in the compressed air supply system, the electronic control module being coupled with the first and second valve units.

4. The compressed air supply system according to claim 3, wherein the first and second valve units are solenoid valves.

5. The compressed air supply system according to claim 1, further comprising an electronic control module operatively arranged in the compressed air supply system, the electronic control module being coupled with the first and second valve units.

6. The compressed air supply system according to claim 5, wherein the first and second valve units are solenoid valves.

7. The compressed air supply system according to claim 6, further comprising a pressure sensor integrated into the compressed air supply system and coupled to the electronic control module, the pressure sensor be assigned to the further consumer circuit.

8. The compressed air supply system according to claim 5, further comprising a pressure sensor integrated into the compressed air supply system and coupled to the electronic control module, the pressure sensor be assigned to the further consumer circuit.

9. The compressed air supply system according to claim 5, wherein the electronic control module includes an interface operatively configured for transmitting signals indicative of a pressure in the further consumer circuit.

10. A method for operating a compressed air supply system having a compressed air inlet coupleable to a compressor, a filter module coupled to the compressed air inlet via a delivery line, a discharge valve unit coupled to a discharge outlet and the delivery line, a first valve unit, and a second valve unit arranged in a regeneration air path for regenerating the filter module, the method comprising the acts of:

supplying a consumer circuit coupled to the compressed air supply system with compressed air via at least one pneumatically closable overflow valve;

controlling a control inlet of the discharge valve unit via the first valve; and actuating the at least one pneumatically closable overflow valve via the second valve unit;

wherein said one pneumatically closable overflow valve is assigned to a particular consumer circuit which, in an event of a failure of the overflow valve, is fillable with a higher priority than at least one additional parallel consumer circuit; and wherein upon closing of said overflow valve, at least one further consumer circuit is fillable before the consumer circuit coupleable to said at least one pneumatically closable overflow valve.

11. The method according to claim 10, further comprising the act of:

filling at least one further consumer circuit before the consumer circuit coupled to the at least one pneumatically closable overflow valve upon closing of a pneumatically closable overflow valve assigned to a higher priority consumer circuit than the further consumer circuit.

12. The method according to claim 11, wherein the further consumer circuit is assigned to a pneumatic suspension of the commercial vehicle.

13. The method according to claim 12, wherein the acts are controlled by an electronic control module of the compressed air supply system.

14. The method according to claim 13, further comprising the acts of:

determining, in the compressed air supply system, pressure in the further consumer circuit; and transmitting a signal indicative of said pressure directly to the electronic control module.

15. The method according to claim 13, further comprising the acts of:

determining a pressure in the further consumer circuit; and relaying a signal indicative of the pressure to the electronic control module via an interface coupled to a data bus.

* * * * *